United States Patent
Nadell et al.

(10) Patent No.: US 10,657,507 B2
(45) Date of Patent: May 19, 2020

(54) MIGRATION BETWEEN DIGITAL RIGHTS MANAGEMENT SYSTEMS WITHOUT CONTENT REPACKAGING

(75) Inventors: Katherine K. Nadell, San Jose, CA (US); Sunil Agrawal, Fremont, CA (US)

(73) Assignee: Adobe Inc., San Jose, CA (US)

( * ) Notice: Subject to any disclaimer, the term of this patent is extended or adjusted under 35 U.S.C. 154(b) by 2112 days.

(21) Appl. No.: 12/781,708

(22) Filed: May 17, 2010

(65) Prior Publication Data
US 2013/0340085 A1 Dec. 19, 2013

(51) Int. Cl.
G06Q 20/12 (2012.01)
G06F 21/10 (2013.01)

(52) U.S. Cl.
CPC ......... *G06Q 20/1235* (2013.01); *G06F 21/10* (2013.01)

(58) Field of Classification Search
CPC . G06Q 20/1235; G06Q 2220/18; G06F 21/10
USPC .................................... 705/59, 902
See application file for complete search history.

(56) References Cited

U.S. PATENT DOCUMENTS

| | | | | |
|---|---|---|---|---|
| 5,892,900 | A * | 4/1999 | Ginter et al. | 726/26 |
| 7,185,047 | B1 * | 2/2007 | Bate et al. | 709/202 |
| 7,644,044 | B2 | 1/2010 | Candelore | |
| 2002/0059440 | A1 * | 5/2002 | Hudson et al. | 709/231 |
| 2003/0048907 | A1 * | 3/2003 | Nakahara et al. | 380/277 |
| 2003/0220880 | A1 * | 11/2003 | Lao et al. | 705/51 |
| 2003/0233330 | A1 * | 12/2003 | Raley et al. | 705/55 |
| 2004/0133632 | A1 * | 7/2004 | Messerges et al. | 709/203 |
| 2005/0027871 | A1 * | 2/2005 | Bradley | G06Q 20/1235 709/227 |
| 2005/0044391 | A1 * | 2/2005 | Noguchi et al. | 713/193 |
| 2005/0065891 | A1 * | 3/2005 | Lee | G06F 21/10 705/59 |
| 2006/0026691 | A1 * | 2/2006 | Kim et al. | 726/27 |
| 2006/0062426 | A1 * | 3/2006 | Levy | G06F 21/10 382/100 |
| 2006/0095382 | A1 * | 5/2006 | Mahlbacher | 705/59 |
| 2006/0107046 | A1 * | 5/2006 | Raley et al. | 713/168 |

(Continued)

OTHER PUBLICATIONS

White et al., "How Computers Work", Oct. 2003, Que.*

*Primary Examiner* — Steven S Kim
(74) *Attorney, Agent, or Firm* — Kilpatrick Townsend & Stockton LLP

(57) ABSTRACT

Methods, computer-implemented systems, and apparatus provide for a DRM Migrator that extracts embedded first license information that enables licensed access to content according to a first licensing system. The DRM Migrator sends the first license information to a server compatible with a second licensing system. After sending the first license information to the server, the DRM Migrator receives second license information that enables an end user to create a request for a license that provides access to the content according to the second licensing system. Another embodiment of the DRM Migrator also receives the first license information from a source and generates the second license information. After generating the second license information, the DRM Migrator sends the second license information to the source to enable creation of a request for a license that provides access to the content according to the second licensing system.

8 Claims, 7 Drawing Sheets

(56) References Cited

U.S. PATENT DOCUMENTS

| | | | |
|---|---|---|---|
| 2006/0212405 A1* | 9/2006 | Gordon | G06F 21/10 705/59 |
| 2007/0006324 A1* | 1/2007 | Osada et al. | 726/27 |
| 2007/0112679 A1* | 5/2007 | Kwon | 705/51 |
| 2007/0198364 A1* | 8/2007 | Quoc | G06F 21/10 705/26.1 |
| 2007/0208668 A1* | 9/2007 | Candelore | 705/57 |
| 2007/0255659 A1* | 11/2007 | Yen et al. | 705/51 |
| 2009/0089884 A1* | 4/2009 | Watson | G06F 21/10 726/28 |
| 2009/0199287 A1 | 8/2009 | Vantalon et al. | |
| 2009/0293131 A1* | 11/2009 | Pak | G06F 21/10 726/26 |
| 2010/0043077 A1* | 2/2010 | Robert | 726/27 |
| 2011/0010777 A1* | 1/2011 | Robert | G06F 21/10 726/29 |

* cited by examiner

MIGRATION BETWEEN DIGITAL RIGHTS MANAGEMENT SYSTEMS WITHOUT CONTENT REPACKAGING

BACKGROUND

The advent of digital media and analog/digital conversion technologies have vastly increased the concerns of individuals and organizations who depend on revenue generated from works protected under copyright law. Today, it is relatively easy for consumers to convert digital media (which may or may not be copyrighted) according to various digital formats which allow for the unauthorized distribution of copies of the digital media over the Internet or amongst various computerized devices.

In an effort to impede such unauthorized distribution of copies of digital media, media publishers and/or media distributors have created various approaches to digital rights management (DRM). DRM technologies attempt to control an end user's access to digital media, as well as prevent the end user from converting the digital media into different digital formats for unauthorized uses.

Stated differently, DRM is a generic term for access control technologies implemented by digital media publishers, copyright holders and individuals in order to impose limitations on the usage of digital content and devices. The term "DRM" is used to describe any technology that inhibits access, various types of uses and distribution of digital content not desired or intended by the media publisher and/or media distributor.

As those end users who wish to distribute unauthorized copies of digital media utilize increasingly advanced format conversion and media distribution software, media publishers and/or media distributors are continually improving and changing their DRM technologies. As the field of the DRM technology has matured, some media publishers and/or media distributors have implemented different DRM technologies over time—thereby making it possible that their newer digital media is protected according to a new DRM technology, whereas their older digital media is still protected according to an older DRM technology.

BRIEF DESCRIPTION

Current DRM technologies suffer from a variety of deficiencies. As an example, a digital media publisher (and/or digital media distributor) may have implemented new DRM technology—which differs greatly from previous DRM technology implemented by the digital media publisher (and/or digital media distributor). Thus, older digital media currently protected by the previous DRM technology will not be properly accessible by an end user attempting to access the older digital media via software (and/or hardware) compatible with the new DRM technology.

To make the older digital media accessible to an end user who has adopted software compatible with the new DRM technology, the digital media publisher (and/or digital media distributor) must collect all the older digital media and adapt the older digital media to be compatible with the new DRM technology.

For example, the older digital media may have been previously "packaged" with embedded metadata based on the old DRM technology. In other words, software compatible with the old DRM technology is capable of processing the embedded metadata in order to determine the end user's various access rights, privileges and restrictions with regard to consuming, copying and distributing the older digital media. In light of the new DRM technology, the digital media publisher (and/or digital media distributor) is forced to "repackage" the older digital media with embedded metadata compatible with the new DRM technology. Such a "repackaging" approach is time consuming and does not necessarily eliminate the chance that end users may still encounter older digital media content with embedded metadata compatible with the old DRM technology—even after the digital media publisher (and/or digital media distributor) has invested resources to "repackage" all of its older digital media.

Techniques discussed herein significantly overcome the deficiencies of conventional DRM technologies such as those discussed above. As will be discussed further, certain specific embodiments herein are directed to a Digital Rights Migrator that provides an end user a proper license to access content (i.e. digital media, video, audio, digital documents, images, graphics, data) which is packaged according to an older DRM technology—even though the end user has adopted software compatible with a newer DRM technology. In other words, when the end user's software (such as any form of a digital media player) encounters the older digital media's embedded metadata (from the older DRM technology) the DRM Migrator provides the end user with a license to consume the older digital media via the new DRM technology.

Thus, the DRM Migrator allows the digital media publisher (and/or digital media distributor) of the older digital media to avoid having to "repackage" the older digital media, while ensuring that end user's who have already adopted software compatible with the new DRM technology will be able to have the proper licensed access to the older digital media. Another key advantage of not requiring "repackaging" is that there are some instances where the digital media publisher doesn't even have a central repository of older digital media—thereby making "repackaging" of older digital media impossible.

Specifically, in various embodiments, a computer-implemented system, methods and apparatus provide a client-based DRM Migrator that extracts first license information embedded in content, where the first license information enables licensed access to the content according to a first licensing system. The client-based DRM Migrator sends the first license information to a server compatible with a second licensing system, where the first licensing system is different than the second licensing system. After sending the first license information to the server, the client-based DRM Migrator receives second license information that enables an end user to create a request for a license, where the license provides access to the content according to the second licensing system.

For example, the client-based DRM Migrator works in conjunction with a digital media player receiving a digital video file with embedded first license information. The first license information allows consumption, use and access of the digital video file according to a license obtained from the first licensing system. However, the digital media player enforces licenses obtained from the second licensing system. The client-based DRM Migrator extracts the embedded first license information and sends the first license information to the server-based DRM Migrator. The client-based DRM Migrator receives second license information from the server-based DRM Migrator. Upon receipt of the second license information, the client-based DRM Migrator uses the second license information to create a request for the server-based DRM Migrator to send a license to access the digital file that is compatible with the second licensing system—and thereby enforceable by the digital media player.

The client-based DRM Migrator caches the second license information. When the digital media player encounters a second instance of the digital video file with the embedded first license information, the client-based DRM Migrator recognizes the digital video file and (instead of extracting the embedded first license information) obtains the cached second license information. The client-based DRM Migrator creates a new request, based on the cached second license information, for a new license to access the second instance of the digital video file. The client-based DRM Migrator sends the new request to the server-based DRM Migrator. The server-based DRM Migrator processes the new request and sends a new license to the client-based DRM Migrator, where the new license is compatible with the second licensing system and thereby enforceable by the digital media player.

In another embodiment, a computer-implemented system, methods and apparatus provide a server-based DRM Migrator that receives first license information from a source, where the first license information enables licensed access of content according to the first licensing system. The server-based DRM Migrator generates second license information based on the first license information, where the second license information enables licensed access of the content according to the second licensing system. After generating the second license information, the server-based DRM Migrator sends the second license information to the source to enable creation of a request for a license that provides access to the content according to the second licensing system.

Additionally, the server-based DRM Migrator caches the second license information. The digital media player (or a different digital media player) can encounter a second instance of the content and try to a obtain a license to access the second instance of the content. The server-based DRM Migrator will again receive the first license information with respect to the second instance of the content, Based on the subsequent receipt of the first license information, the server-based DRM Migrator access the cache and sends a copy of the cached second license information to a source currently processing the second instance of the content. The copy of the cached second license information thereby enables creation of a request for a new license at the source processing the second instance of the content.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a DRM Migrator, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
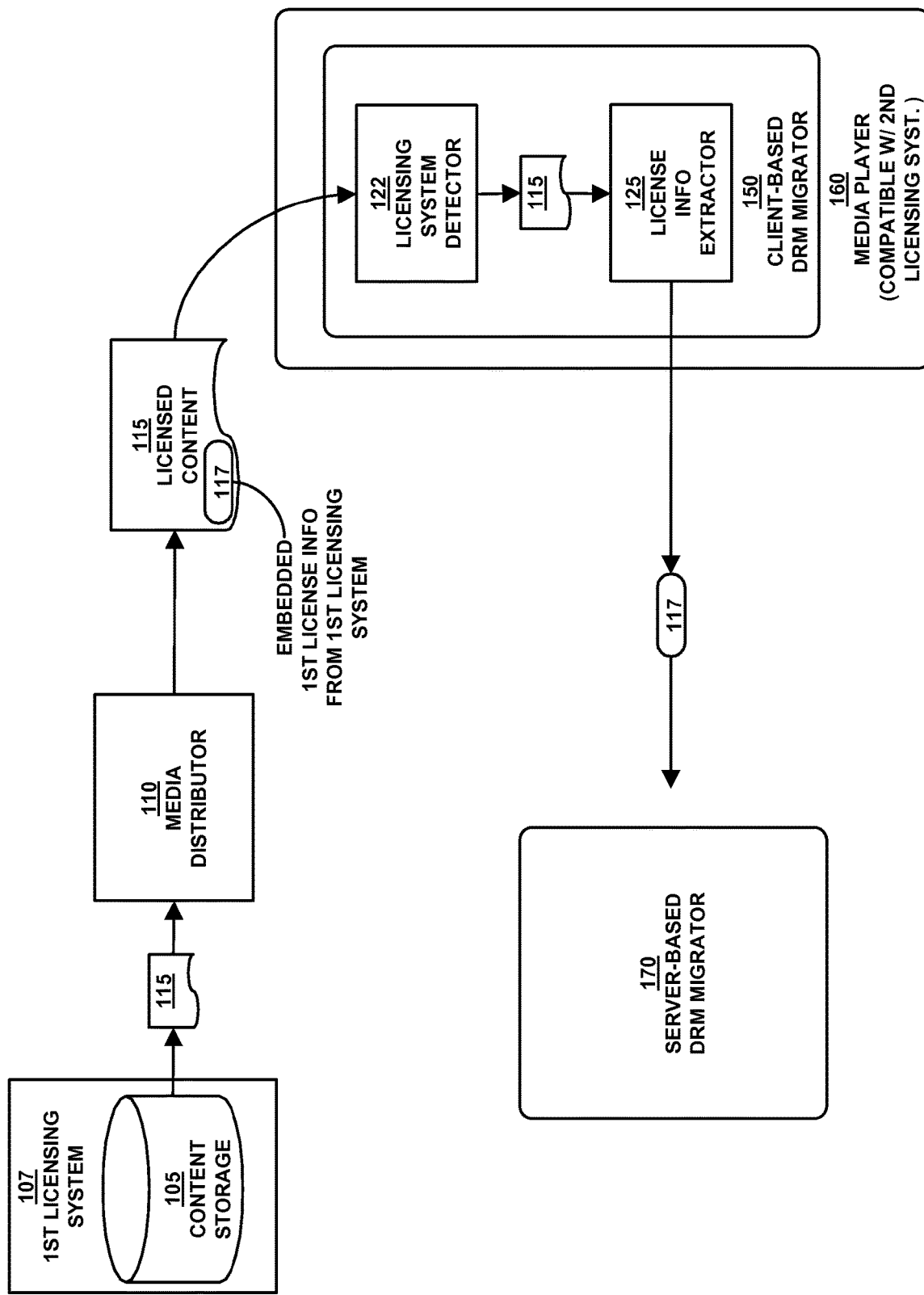
FIG. 1 is an example block diagram of a client-based DRM Migrator sending embedded first license information to a server-based DRM Migrator according to embodiments herein.

Methods, computer-implemented systems, and apparatus described herein provide for a client-based DRM Migrator 150 and a server-based DRM Migrator 170. The interactions performed between the client-based DRM Migrator 150 and the server-based DRM Migrator 170 allow for access to content licensed according to a first licensing system via software (such as a digital media player) that is compatible with a second licensing system that does not enforce licenses created by the first licensing system.

For example, in one embodiment, a client computer system receives a video file (i.e. licensed content) and the video file contains embedded metadata compatible with a first licensing system. The embedded metadata provides information regarding access rights, license policies, and use privileges. However, the client computer system runs a digital media player that is compatible with a second licensing system—which does not adhere to the protocols and formats of the first licensing system.

The client-based DRM Migrator 150 (which can work in conjunction with the digital media player) extracts the embedded metadata (i.e. licensing information) from the video file and sends at least a portion of the embedded metadata (i.e. licensing information) to the server-based DRM Migrator 170. The server-based DRM Migrator 170 responds by sending second license information back to the client-based DRM Migrator 150. It is understood that the second license information 200 includes a description of the access rights, license policies, and use privileges described in the video file's embedded metadata, by the first licensing system, to control how an end-user accesses and consumes the video file. However, the second license information is created by the server-based DRM Migrator 170 and uses the format and/or protocol of the second licensing system.

Upon receipt of the second license information, the client-based DRM Migrator 150 processes the second license information to create a request for a license to access the video file whose license (described in the embedded metadata) is enforced according to the first licensing system. The client-based DRM Migrator 150 sends the request to the server-based DRM Migrator 170. Based on at least a portion of the second license information that is provided in the request, the server-based DRM Migrator 170 compiles the second license information to create a license that enables access to the video file according to the second licensing system—even though the video file was received with the embedded metadata that is compatible with the first licensing system.

The client-based DRM Migrator 150 receives the license from the server-based DRM Migrator 170 and accesses the video file according to the policies, restrictions, access rights and privileges included in the license. In addition, the client-based DRM Migrator 150 caches a copy of the second license information so that, when the digital media player encounters a second instance of the video file (or the license expires), the client-based DRM Migrator 150 can create a new license request based on the cached the second license information—instead of repeating the step of sending the embedded metadata to the server-based DRM Migrator 170.

Also, the server-based DRM Migrator 170 caches the license it created in response to receiving the second license information from the client-based DRM Migrator 150. Thus, when the server-based DRM Migrator 170 receives the new license request from the client-based DRM Migrator 150, the server-based DRM Migrator 170 can efficiently respond by sending a new license based on the license that is already stored in cache.

In another embodiment, the server-based DRM Migrator 170 can also cache the second license information, which can be used to respond to the client-based DRM Migrator 150 when the client-based DRM Migrator 150 sends a second instance of the first license information.

In yet another embodiment, it is understood the server-based DRM Migrator 170 can create a license based on receipt of first license information sent from the client-based DRM Migrator 150. Thus, the server-based DRM Migrator 170 does not wait to receive an actual request for a license from the client-based DRM Migrator 150.

Figure 2:
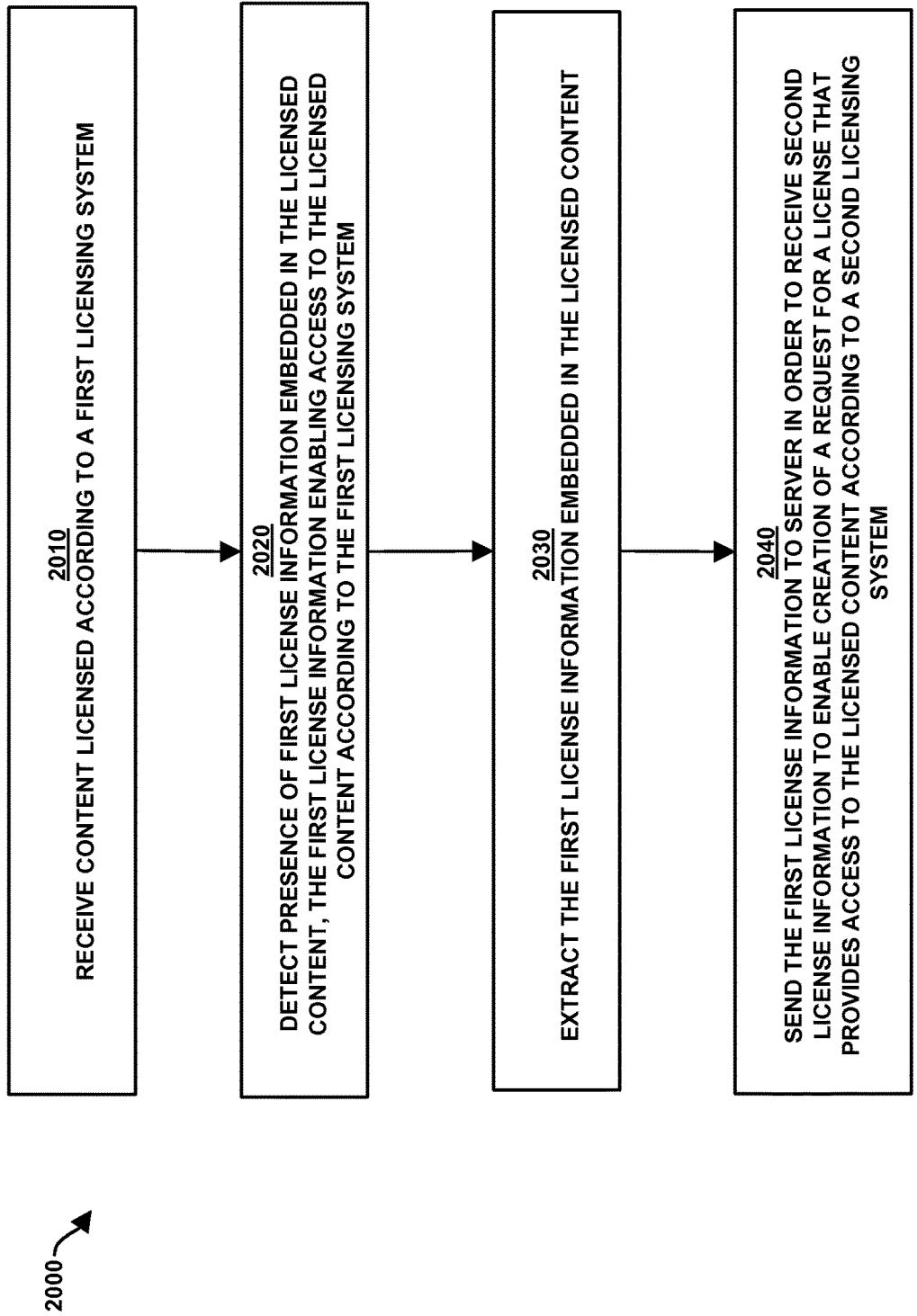
FIG. 2 is a flowchart of an example of processing steps performed by the client-based DRM Migrator to send embedded first license information to the server-based DRM Migrator according to embodiments herein.
Figure 3:
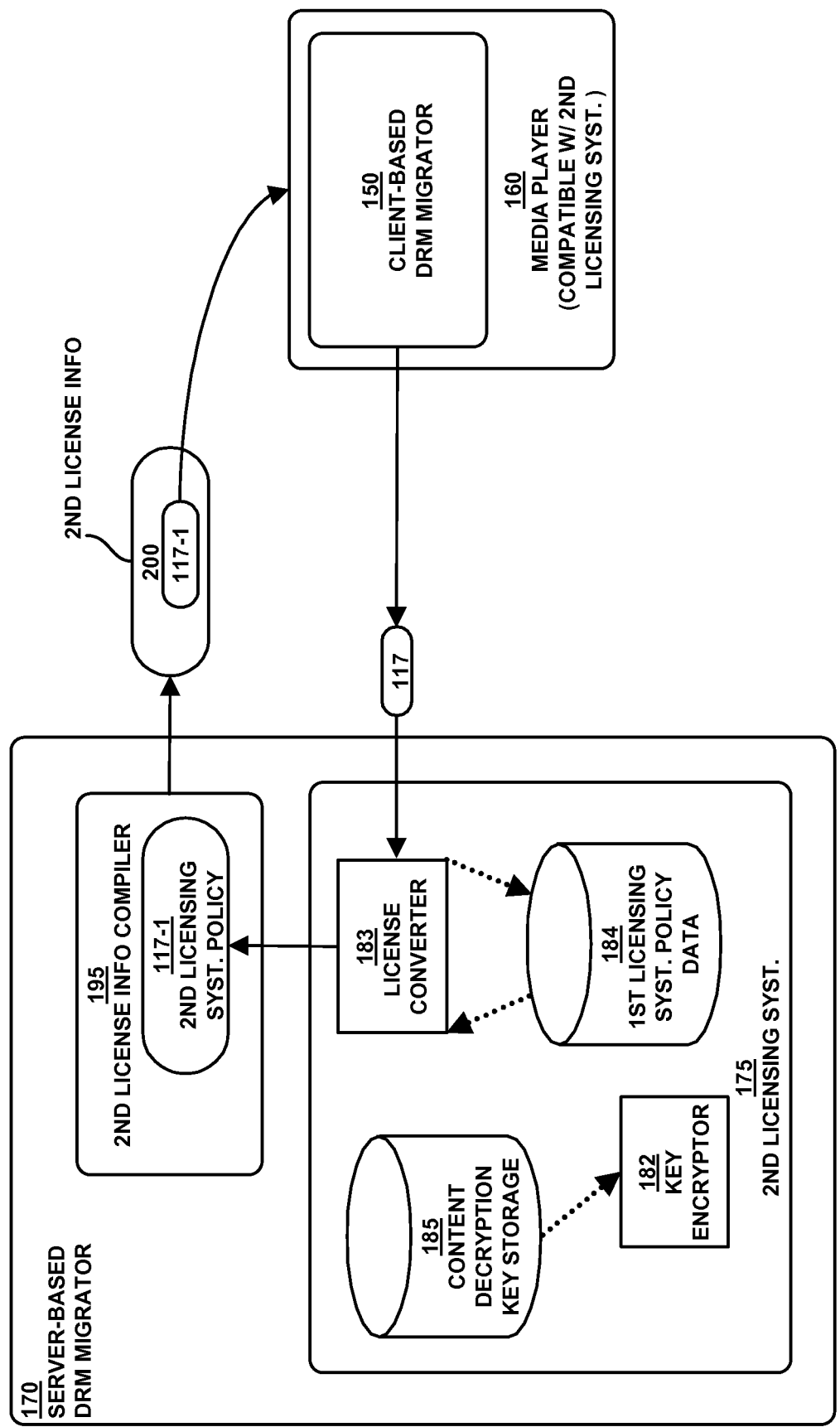
FIG. 3 is an example block diagram of the server-based DRM Migrator sending second license information to the client-based DRM Migrator according to embodiments herein.
Figure 4:
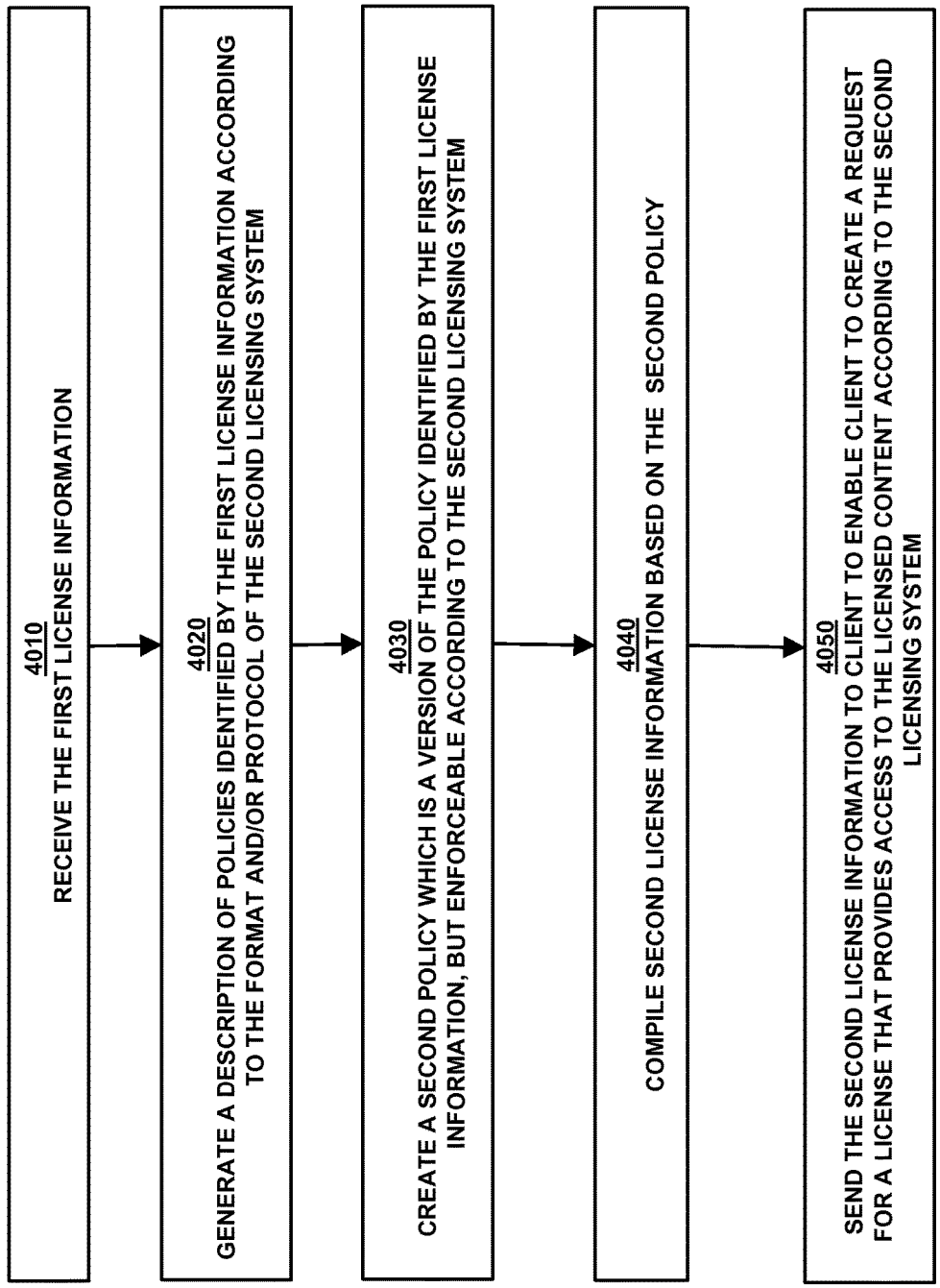
FIG. 4 is a flowchart of an example of processing steps performed by the server-based DRM Migrator to send second license information to the client-based DRM Migrator according to embodiments herein.
Figure 5:
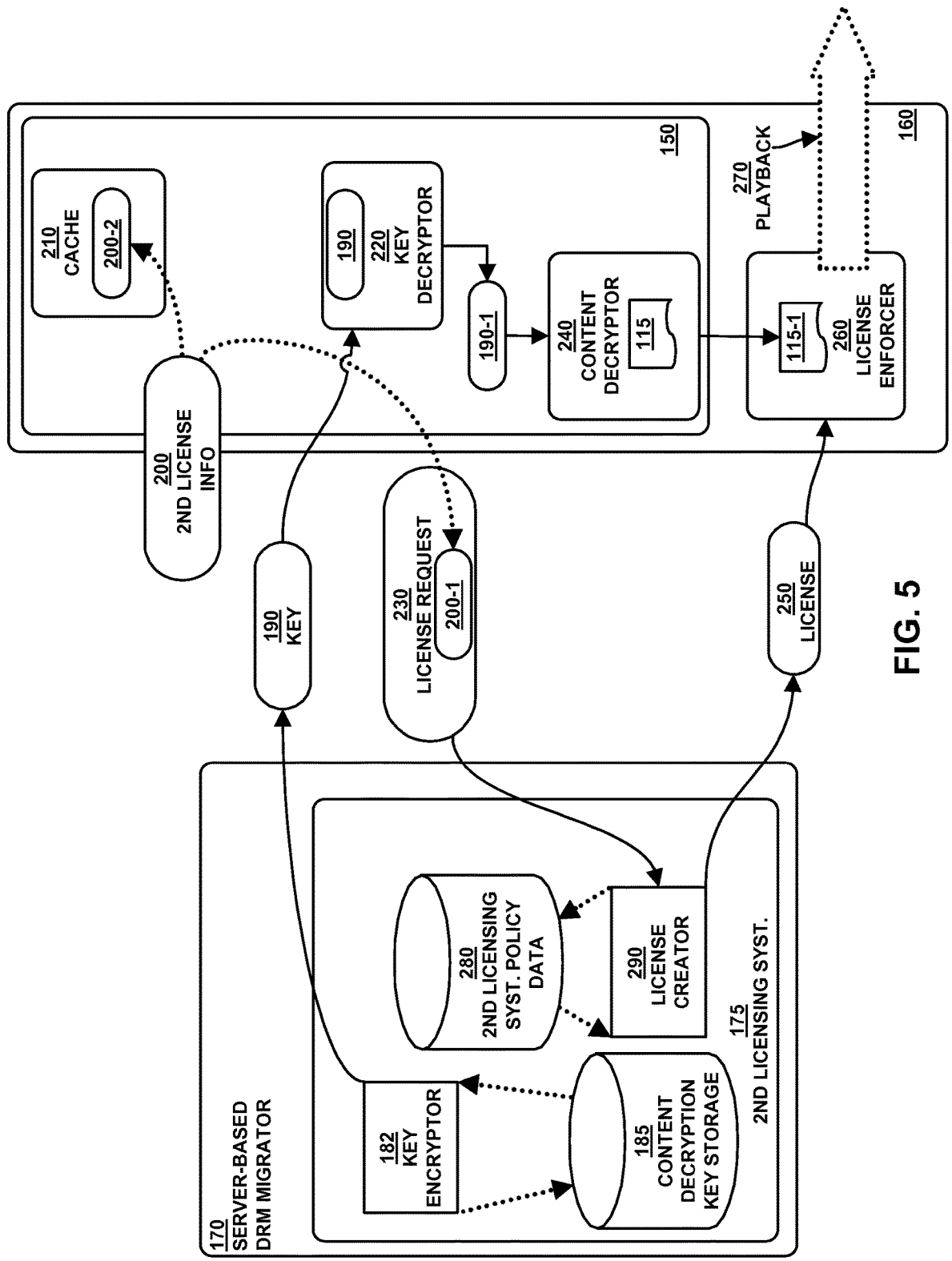
FIG. 5 is an example block diagram of the client-based DRM Migrator sending a request for a license to the server-based DRM Migrator according to embodiments herein.
Figure 6:
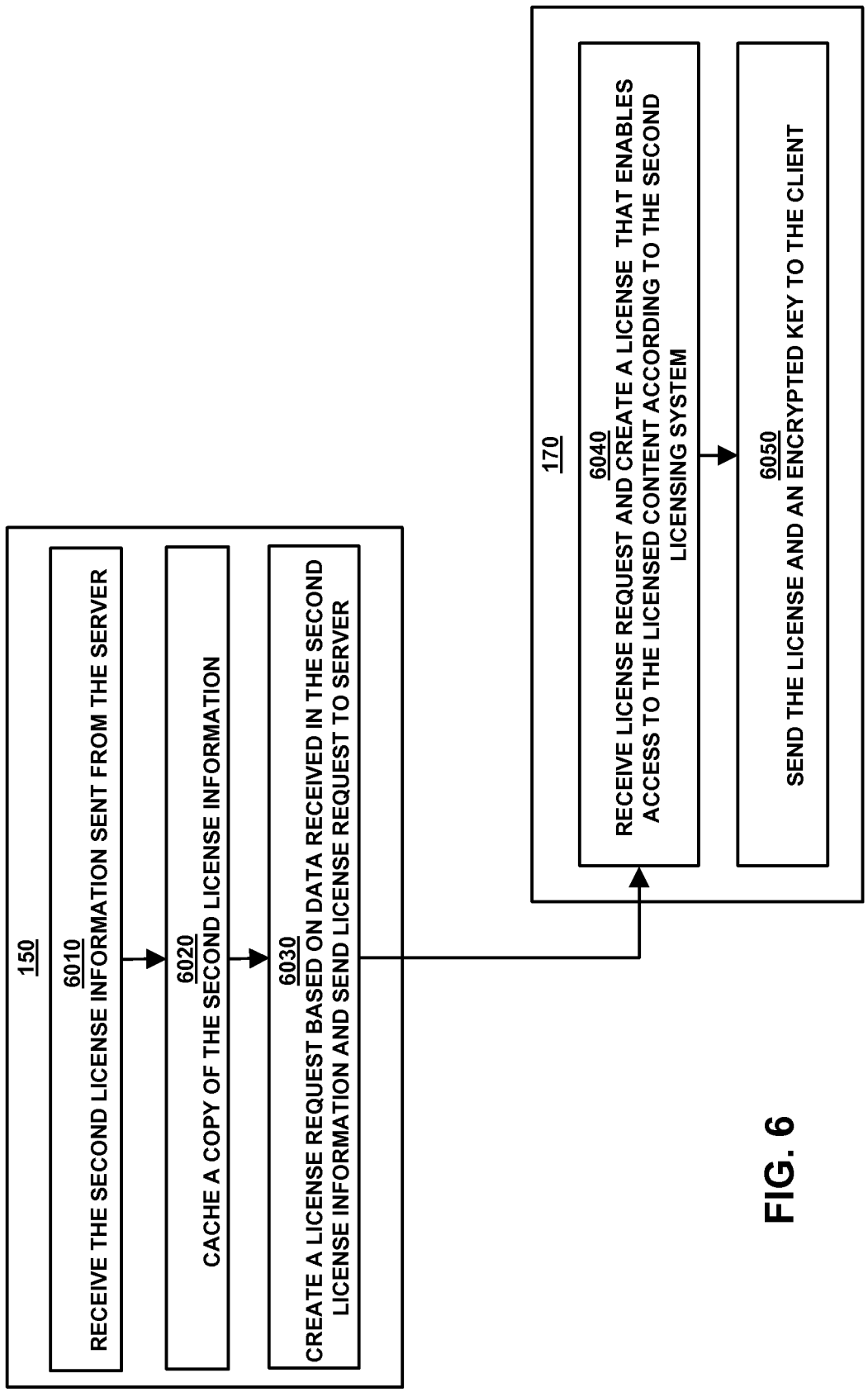
FIG. 6 is a flowchart of an example of processing steps performed by the client-based DRM Migrator sending a request for a license to the server-based DRM Migrator according to embodiments herein.

Turning now to FIGS. 1-6, it is noted that FIGS. 1, 3 and 5 are block diagrams which show examples of processing described in FIGS. 2, 4 and 6, respectively. FIGS. 2, 4 and 6 illustrate flowcharts of processing of various embodiments of the client-based DRM Migrator 150 and the server-based DRM Migrator 170. The rectangular elements in flowcharts 2000, 4000 and 6000 (illustrated in FIGS. 2, 4 and 6—respectively) denote "processing blocks" and represent computer software instructions or groups of instructions upon a computer readable medium.

Additionally, the processing blocks represent steps performed by hardware such as a computer, digital signal processor circuit, application specific integrated circuit (ASIC), etc. As the processing in the flowcharts 2000, 4000 and 6000 is described, reference will be made to various aspects illustrated in FIGS. 1, 3 and 5.

Flowcharts 2000, 4000 and 6000 do not necessarily depict the syntax of any particular programming language. Rather, flowcharts 2000, 4000 and 6000 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

FIG. 1 is an example block diagram of a client-based DRM Migrator 150 sending embedded first license information (e.g. at least a portion of embedded metadata) to a server-based DRM Migrator 170 according to embodiments herein. The aspects illustrated in FIG. 1 are discussed with respect to flowchart 2000 of FIG. 2, which is a flowchart 2000 of an example of processing steps performed by the client-based DRM Migrator 150 to send embedded first license information to the server-based DRM Migrator 170 according to embodiments herein.

A media distributor 110 accesses content storage 105 and sends licensed content 115 to a media player 160. The media distributor 110 distributes content licensed according to a first licensing system 107, which embeds first license information 117 within the licensed content 115. The embedded first license information 117 identifies a license that allows access to the licensed content 115 according to the first licensing system 107. However, the media player 160 is compatible with a second licensing system 175 which enforces content licenses according to a protocol and/or format not used by the first licensing system 107. Thus, an end user running the media player 160 will not be able to have access to view the licensed content 115.

At step 2010, the client-based DRM Migrator 150 (which works in conjunction with the media player 160) receives the licensed content 115.

At step 2020, the client-based DRM Migrator 150 implements a licensing system detector 122 that detects the presence of the embedded first license information 117, thereby determining that access to the licensed content 115 is enabled according to the first licensing system 107—and not the second licensing system 175 with which the media player 160 is compatible.

In addition, in one embodiment, the client-based DRM Migrator 150 can communicate with the server-based DRM Migrator 170 to determine whether the server-based DRM Migrator 170 supports the second licensing system 175. Upon receiving a request, from the client-based DRM Migrator 150, to determine whether the server-based DRM Migrator 170 supports the second licensing system 175, the server-based DRM Migrator 170 checks whether the client-based DRM Migrator 150 currently supports first licensing system 107 or the second licensing system 175. If the client-based DRM Migrator 150 supports first licensing system 107, the server-based DRM Migrator 170 sends back a message to the client-based DRM Migrator 150 (and/media player 160) to update itself to be compatible with the second licensing system 175. If the client-based DRM Migrator 150 supports the second licensing system 175, the server-based DRM Migrator 170 sends back a message acknowledging that the server-based DRM Migrator 170 supports the second licensing system 175.

At step 2030, the client-based DRM Migrator 150 implements a license information extractor 125 to extract the first license information 117 embedded in the licensed content 115. For example, in one embodiment, the first license information 117 can be a string of characters and/or numbers that function as a tag that identifies various first licensing system policies incorporated into the license that controls access to the licensed content 115.

At step 2040, the client-based DRM Migrator 150 sends the first license information 117 to the server-based DRM Migrator 170 that is compatible with the format and/or protocols used to create and distribute licenses according to the second licensing system 175. In one embodiment, the client-based DRM Migrator 150 sends the first license information 117 to the server-based DRM Migrator 170 in order to receive second license information 200 that enables the client-based DRM Migrator 150 to create a request for a license that provides access to the content 115 according to the second licensing system 175.

FIG. 3 is an example block diagram of the server-based DRM Migrator 170 sending second license information to the client-based DRM Migrator 150 according to embodiments herein. The aspects illustrated in FIG. 3 are discussed with respect to flowchart 4000 of FIG. 4, which is a flowchart 4000 of an example of processing steps performed by the server-based DRM Migrator 170 to send second license information to the client-based DRM Migrator 150 according to embodiments herein.

At step 4010, the server-based DRM Migrator 170 receives the first license information 117 from the client-based DRM Migrator 150.

At step 4020, the server-based DRM Migrator 170 implements a license converter 183 in order to generate a description of policies, identified in the first license information 117, according to the format and/or protocol of the second licensing system 175. In one embodiment, the first license information 117 is a license identifier indicating various policies of the license that describe the types of allowable access of the content 115 enforced according to the first licensing system 107. The license converter 183 can extract such policies from first licensing system policy data 184 and recast (i.e. convert) the policies according to the format and/or protocol of the second licensing system 175.

At step 4030, the server-based DRM Migrator 170 creates, via the license converter 183, a second policy 117-1—which is a version of the policy identified in the first license information 117, but enforceable according to the second licensing system 175.

At step 4040, the server-based DRM Migrator 170 implements a second license information compiler 195 to compile and create second license information 200 based on the second policy 117-1.

At step 4050, the server-based DRM Migrator 170 sends the second license information 200 to the client-based DRM Migrator 150 to enable the client-based DRM Migrator 150 to create a request for a license that provides the media player 160 access to the licensed content 115 via a license that is formatted according to the second licensing system 175.

FIG. 5 is an example block diagram of the client-based DRM Migrator 150 sending a request for a license to the server-based DRM Migrator 170 according to embodiments herein. The aspects illustrated in FIG. 5 are discussed with respect to flowchart 6000 of FIG. 6, which is a flowchart 6000 of an example of processing steps performed by the client-based DRM Migrator 150 sending a request for a license to the server-based DRM Migrator 170 according to embodiments herein.

At step 6010, the client-based DRM Migrator 150 receives the second license information 200 sent from the server-based DRM Migrator 170.

At step 6020, the client-based DRM Migrator 150 creates a copy of the second license information 200-1 and places the copy of the second license information 200-2 in a cache 210. When the client-based DRM Migrator 150 later receives a second instance of the licensed content (or when a previously received license to the licensed content 115 has already expired), the client-based DRM Migrator 150 accesses the cache 210 in order to create a new request for a license that provides licensed access, according to the second licensing system 175, to the second instance of the licensed content. Thus, with the copy of the second license information 200-2 in the cache 210, the client-based DRM Migrator 150 can skip having to extract the first license information embedded within the second instance of the licensed content 115.

At step 6030, the client-based DRM Migrator 150 creates a license request 230 based on data 200-1 received in the second license information 200.

At step 6040, the server-based DRM Migrator 170 receives the license request 230 and implements a license creator 290 to create a license 250 that enables access to the licensed content 115 according to the second licensing system 175. The license creator 290 creates the license 250 with second licensing system policy data 280 that corresponds with the data 200-1 received in the license request 230. Additionally, server-based DRM Migrator 170 can create different policies for different users associated with different, respective client-based DRM Migrators. For example, the server-based DRM Migrator 170 can generate licenses with different access privileges and expirations dates for various users (and/or client systems).

As the server-based DRM Migrator 170 creates the license, the server-based DRM Migrator retrieves a content decryption key from content decryption key storage 185 and implements a key encryptor 182 to produce an encrypted key 190. The server-based DRM Migrator 170 sends the encrypted key 190 to the client-based DRM Migrator 150. Upon receipt of the encrypted key 190, the client-based DRM Migrator 150 will decrypt the key 190 to obtain a content decryption key 190-1. The content decryption key will be used by the client-based DRM Migrator 150 to decrypt the licensed content 115. It is also understood that the key 190 can be included in the license 250, sent separately from the license 250 or sent in conjunction with the license 250.

The client-based DRM Migrator 150 processes the encrypted key 190 via a key decryptor 220 to obtain a content decryption key 190-1. The client-based DRM Migrator 150 applies the content decryption key 190-1 to the licensed content 115 via a content decryptor 240 to generate decrypted licensed content 115-1. The client-based DRM Migrator 150 processes the license 250 through a license enforcer 260, which applies the license 250 to the decrypted content 115-1 to enable playback 270 of the decrypted content 115-1 according to the policies, access rights and use privileges described in the license 250.

In addition, in one embodiment, upon receiving the license request 230, the server-based DRM Migrator 170 decrypts the request and authenticates the client-based DRM Migrator 150. The server-based DRM Migrator 170 can also determine whether the license request 230 was corrupted during transit by verifying a signature associated with the second license information 200-1 included in the license request.

At step 6050, the client-based DRM Migrator 150 decrypts the key 190 to obtain a decrypted key 190-1. The client-based DRM Migrator 150 applies the decrypted key 190-1 to the licensed content 115 in order to produce decrypted licensed content 115-1.

Figure 7:
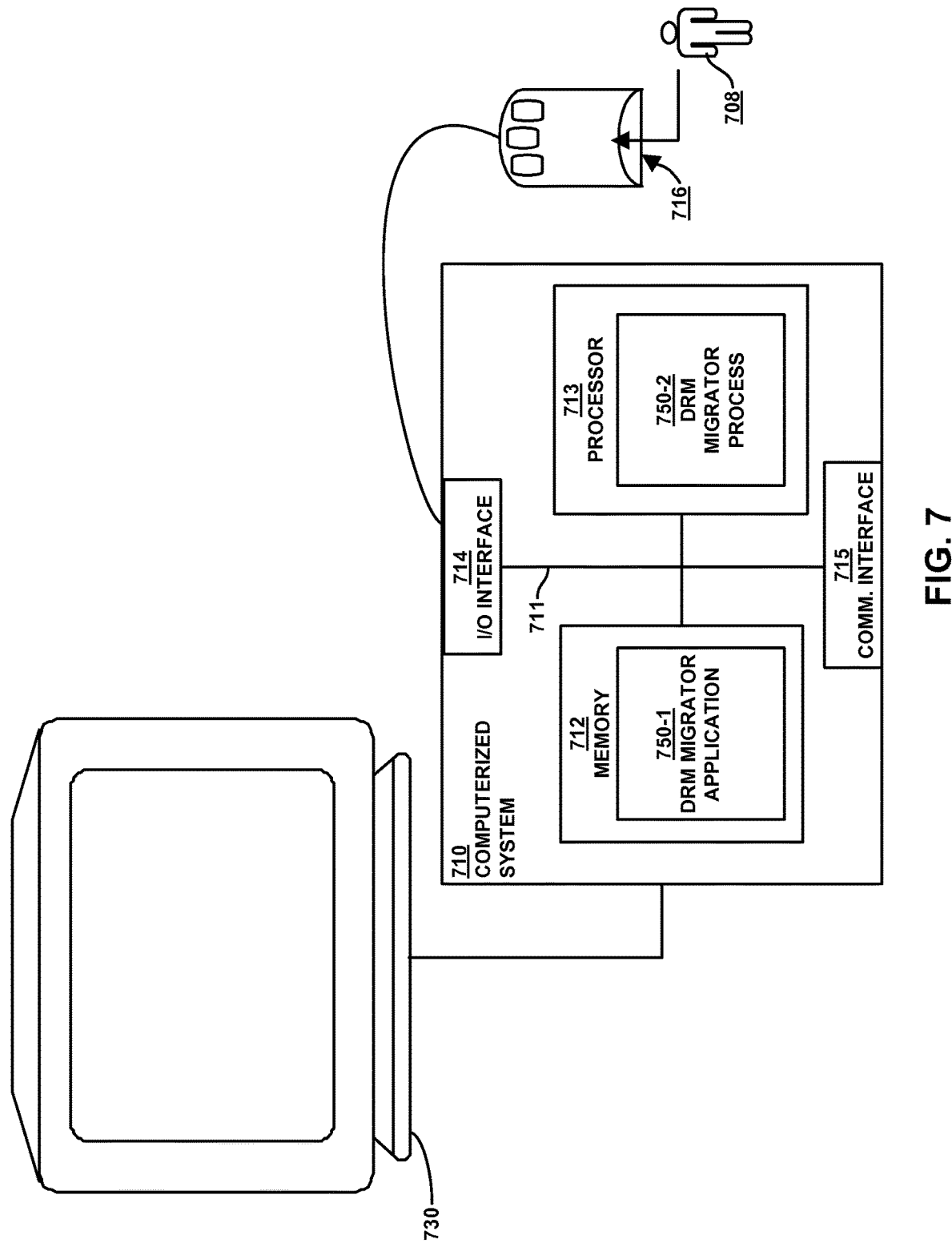
FIG. 7 is an example block diagram illustrating an architecture of a computer system that executes, runs, interprets, operates or otherwise performs a DRM Migrator application and/or DRM Migrator process according to embodiments herein.

FIG. 7 is an example block diagram illustrating an architecture of a computer system 710 that executes, runs, interprets, operates or otherwise performs a DRM Migrator application 750-1 and/or DRM Migrator process 750-2 (e.g. an executing version of a DRM Migrator 750 as controlled or configured by user 708) according to embodiments herein.

Note that the computer system 710 may be any type of computerized device such as a personal computer, a client computer system, a server computer system, workstation, portable computing device, console, laptop, network terminal, etc. This list is not exhaustive and is provided as an example of different possible embodiments.

In addition to a single computer embodiment, computer system 710 can include any number of computer systems in a network environment to carry the embodiments as described herein.

As shown in the present example, the computer system 710 includes an interconnection mechanism 711 such as a data bus, motherboard or other circuitry that couples a memory system 712, a processor 713, an input/output interface 714, and a display 730. If so configured, the display can be used to present a graphical user interface of the DRM Migrator 750 to user 708. An input device 716 (e.g., one or more user/developer controlled devices such as a keyboard, mouse, touch pad, etc.) couples to the computer system 710 and processor 713 through an input/output (I/O) interface 714. The computer system 710 can be a client system and/or a server system. As mentioned above, depending on the embodiment, the DRM Migrator application 750-1 and/or the DRM Migrator process 750-2 can be distributed and executed in multiple nodes in a computer network environment or performed locally on a single computer.

During operation of the computer system 710, the processor 713 accesses the memory system 712 via the interconnect 711 in order to launch, run, execute, interpret or otherwise perform the logic instructions of the DRM Migrator application 750-1. Execution of the DRM Migrator application 750-1 in this manner produces the DRM Migrator process 750-2. In other words, the DRM Migrator process 750-2 represents one or more portions or runtime instances of the DRM Migrator application 750-1 (or the entire application 750-1) performing or executing within or upon the processor 713 in the computerized device 710 at runtime.

The DRM Migrator application 750-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 710 may include other processes and/or software and hardware components, such as an operating system. Display 730 need not be coupled directly to computer system 710. For example, the DRM Migrator application 750-1 can be executed on a remotely accessible computerized device via the communication interface 715.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), notebook computer(s), workstation(s) (e.g., Sun, HP), personal digital assistant(s) (PDA(s)), handheld device(s) such as cellular telephone(s), laptop(s), handheld computer(s), camera(s), camcorder(s), television set-top box(es) or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   extracting, by a processing device, first license metadata from digital content, wherein the first license metadata identifies a first licensing protocol for generating a license request for accessing the digital content;
   determining, by the processing device, a media player incompatibility, wherein a media player executed by the processing device cannot generate the license request using the first licensing protocol and can generate the licensing request using a second licensing protocol, wherein the media player incompatibility comprises the media player being unable to generate the license request using the first licensing protocol;
   based on determining the media player incompatibility, performing, by the processing device, operations comprising:
      sending the first license metadata to a server,
      receiving second license metadata from the server for generating the license request using the second licensing protocol,
      generating the license request based on the second license metadata, and
      sending the license request based on the second license metadata to the server;
   receiving, by the processing device, a license from the server; and
   accessing, by the processing device, the digital content using the license received from the server.

2. The method of claim 1, comprising:
   caching the second license metadata;
   upon detecting subsequent receipt of additional content, retrieving the cached second license metadata;
   generating an additional licensing request based on the second license metadata;
   sending the additional licensing request to the server, the additional licensing request for requesting an additional license to access the additional content;
   receiving the additional license from the server; and
   accessing the additional content according to the additional license.

3. The method of claim 1, further comprising accessing the digital content by the media player according to the second licensing protocol without repackaging the digital content with the second license metadata.

4. A non-transitory computer readable medium comprising instructions executable by a processing device encoded thereon, the instructions comprising:
   instructions for extracting first license metadata from digital content, wherein the first license metadata identifies a first licensing protocol for generating a license request for accessing the digital content;
   instructions for determining a media player incompatibility, wherein a media player executed by the processing device cannot generate the license request using the first licensing protocol and can generate the licensing request using a second licensing protocol, wherein the media player incompatibility comprises the media player being unable to generate the license request using the first licensing protocol;
   instructions for performing operations based on determining the media player incompatibility, the operations comprising
      sending the first license metadata to a server,
      receiving second license metadata from the server for generating the license request using the second licensing protocol,
      generating the license request based on the second license metadata, and
      sending the license request based on the second license metadata to the server;
   instructions for receiving a license from the server; and
   instructions for accessing the digital content using the license received from the server.

5. The non-transitory computer readable medium of claim 4, the instructions further comprising:
   instructions for caching the second license metadata;
   instructions for, upon detecting subsequent receipt of additional content, retrieving the cached second license metadata;
   instructions for generating an additional licensing request based on the second license metadata;

instructions for sending the additional licensing request to the server, the additional licensing request for requesting an additional license to access the additional content;

instructions for receiving the additional license from the server; and instructions for accessing the additional content according to the additional license.

6. The non-transitory computer-readable medium of claim 4, the instructions further comprising instructions for accessing the digital content by the media player according to the second licensing protocol without the digital content being repackaged with the second license metadata.

7. A client computer system comprising:

a processor;

a memory unit storing instructions; and an interconnect coupling the processor and the memory unit, wherein the instructions stored in the memory unit are executable by the processor, wherein execution of the instructions causes the processor to perform operations of:

extracting first license metadata from digital content, wherein the first license metadata identifies a first licensing protocol for generating a license request for accessing the digital content;

determining a media player incompatibility, wherein a media player executed by the processor cannot generate the license request using the first licensing protocol and can generate the licensing request using a second licensing protocol, wherein the media player incompatibility comprises the media player being unable to generate the license request using the first licensing protocol;

based on determining the media player incompatibility, performing operations comprising:

sending the first license metadata to a server, receiving second license metadata from the server for generating the license request using the second licensing protocol, generating the license request based on the second license metadata, and sending the license request based on the second license metadata to the server;

receiving a license from the server; and accessing the digital content using the license received from the server.

8. The client computer system of claim 7, wherein the execution of the instructions further causes the processor to perform additional operations that comprise accessing the digital content by the media player according to the second licensing protocol without the digital content being repackaged with the second license metadata.

* * * * *